United States Patent [19]

Nathans

[11] Patent Number: 4,972,476
[45] Date of Patent: Nov. 20, 1990

[54] COUNTERFEIT PROOF ID CARD HAVING A SCRAMBLED FACIAL IMAGE

[76] Inventor: Robert L. Nathans, 36 Stag Dr., Billerica, Mass. 01821

[21] Appl. No.: 350,220

[22] Filed: May 11, 1989

[51] Int. Cl.$^5$ ............................................. H04K 1/00
[52] U.S. Cl. ..................................... 380/23; 380/25; 380/54; 340/825.34; 283/77
[58] Field of Search .................. 380/10, 25, 16, 54, 380/23; 382/2; 340/825.31, 825.34; 235/380, 382; 350/380; 283/70, 77, 87, 73

[56] References Cited

U.S. PATENT DOCUMENTS

| 3,805,238 | 4/1974 | Rothfjell | 382/2 |
| 4,590,366 | 5/1986 | Rothfjell | 283/77 X |
| 4,765,656 | 8/1988 | Becker et al. | 283/70 |
| 4,864,618 | 9/1989 | Wright et al. | 380/51 |

FOREIGN PATENT DOCUMENTS

| 3610445 | 11/1986 | Fed. Rep. of Germany | 235/380 |
| 8504035 | 9/1985 | World Int. Prop. O. | 235/380 |

OTHER PUBLICATIONS

"Magnetic Encoded Photo Credit Card"; IBM Technical Disclosure Bulletin, vol. 21, No. 6; Nov. 1978; J. Kelley.

Primary Examiner—Thomas H. Tarcza
Assistant Examiner—Tod Swann
Attorney, Agent, or Firm—Robert Nathans

[57] ABSTRACT

A scrambled facial image of an ID card bearer is recorded upon a card and is descrambled only by using the proper descrambling control code assigned to the proper bearer upon verification of the authenticity of the bearer. The pixel scrambling method prevents card duplication, as a reproduced card will unscramble only the image of the proper bearer, and the method inherently prevents producing a card which can be unscrambled by a verifier. Updated scrambling codes are used for newly issued cards from enhanced security. Issue clerk initials are automatically recorded upon the card to deter unlawful card issuance. Also, unscrambled image portions are video recorded for investigation of unlawful use.

28 Claims, 1 Drawing Sheet

COUNTERFEIT PROOF ID CARD HAVING A SCRAMBLED FACIAL IMAGE

BACKGROUND OF THE INVENTION

The present invention relates to the field of identification or ID cards, and more particularly to cards bearing facial images.

For many years ID cards bearing facial images have been the most popular means of restricting access to industrial and military establishments, hospitals, liquor stores and so forth. Photographs have also been used to identify the bearer in the issuance of drivers licenses, passports and other types of ID cards. In the age of terrorism, the prevention of counterfeiting of plastic ID cards, particularly those functioning as passports or national ID cards and sensitive area access badges, is becoming more and more important.

The use of facial images is highly practical since, at least theoretically, the bearer's actual facial image is readily matched with the image on his card, often worn as a badge by, for example, a guard at the entrance of a large company. The use of facial images, in theory, employs the human eyes and brain of the guard, which constitutes a widely available computer, and a facial image carries much information to authenticate the bearer of the card.

It is believed that conventional fairly costly photos for use on ID cards will in many cases be replaced by high speed electronic printers such as ink jet printers. At the issuing station, an electronic camera will scan the face of the bearer, and an array of pixels, having intensity level and color information defining the face of the bearer will be recorded within a small computer and will be thereafter printed on the ID card along with the usual printing indicating the name of the bearer and issuing agency, etc.; see U.S. Pat. No. 4,687,526 issued to Wilfert, and "PC Graphics", Electronics magazine, April 1989.

However, ID cards such as drivers licenses, company badges, liquor store IDs etc. are easy to counterfeit by the substitution of the facial image of an unauthorized bearer, photographed in conjunction with a background field of appropriate printed indicia. Inexpensive laminators and plastic envelopes are widely available to anyone wishing to make counterfeit cards in this manner. As indicated in the Electronics magazine article, relatively inexpensive printers for making photo quality images under the control of PC software should be available in the next couple of years, so that counterfeiting with such apparatus will readily occur.

Other numerous techniques for thwarting counterfeiting are disclosed in the art. Digital data recorded upon the card having a scrambled key embedded therein is unscrambled by an algorithm, and the unscrambled key is compared with a password inputted by the bearer; see Yamamoto U.S. Pat. Nos. 3,665,162 and 4,739,377 issued to Allen. A counterfeiter can however sequentially input large sequences of numbers into the card reader using a PC to find the appropriate matching password for use with stolen cards. Also, the algorithms themselves can be discovered by examination of the data on a plurality of stolen cards. The use of various non-biometric encoding devices embedded within cards to be matched with a personal password keyed in to a verifier by the bearer of the card has also been suggested. See U.S. Pat. No. 4,682,794 issued to Margolis.

Another problem with these techniques is that biometrics is not employed, that is, the infinitely variable physical features of a bona fide bearer are not used for bearer verification by the most widely available computer, namely the human brain and eyeball. Thus numerous patents disclose techniques utilizing biometrics in an attempt to enhance security relative to the practical and thus ubiquitous photo ID card, whereby unfortunately, the photo of an unauthorized bearer may be easily employed on a counterfeit card.

Distortion of an image of a characteristic of the bearer by optical means is suggested in a number of patents. The face of a bearer is distorted and recorded on a card and is thereafter read by a complementary optical device to display the undistorted image. U.S. Pat. Nos. 4,765,656 to Becker, and 3,922,074 to Ikegami teach the use of lenticular lenses for this purpose. Scrambling of an image by fiber optic bundles is known in the art, while U.S. Pat. No. 4,532,508 to Ruel teaches distortion of a holographically printed image of the bearer on the card. However, these approaches have not been widely utilized in the market due to their increased inconvenience, complexity, cost or unreliability.

U.S. Pat. Nos. 3,914,877 to Hines and 4,776,013 to Kafri teach recording a jumbled image for security purposes. Since masking is utilized for this purpose, the conventional gray scale intensity and/or color information is not retained during processing to be utilized to recreate a facial image having sufficient fidelity suitable for bearer verification, and thus this approach is not relevant to the purposes and modes of operation of the present invention.

SUMMARY OF PREFERRED EMBODIMENTS OF THE INVENTION

It is thus a principle object of the present invention to utilize the biometric advantage of photo ID cards in a relatively simple and inexpensive manner, relative to more costly, cumbersome, or unreliable techniques, and yet make ID cards as counterfeit proof as possible.

It is a further object of the present invention to provide an inexpensive method of readily modifying the aforesaid card printer software to record a fully or partially unreadable scrambled or jumbled facial image of the bearer upon an ID card when it is issued. A simple pixel swap algorithm is used in the sub-program for this purpose, and no additional hardware need be provided as the electronic camera, computer and printer is already required by the aforesaid printing method to print the lettering and conventional facial image on the ID card at the issue station.

An additional object of the present invention is to provide a verifier utilized by a guard or other security personnel for descrambling the scrambled image upon the card and displaying it upon a CRT or liquid crystal monitor screen. This conditions the company guard, welfare office clerk, immigration official etc. to pay closer attention to the identity of the bearer, rather than just waving him through as is commonplace. This conditioning, prompted by bearer insertion of the card into a reader and the resulting facial display, thus substantially enhances security, relative to the conventional use of the photo ID card.

A scramble control code such as the last three digits of the bearer's social security code selects one out of 1000 different pixel scrambling modes, and the unreadable scrambled facial image recorded upon the card, is later unscrambled by, for example, having the bearer key in the same three digits into the verifier. Even if a counterfeiter discovers the scramble control code of a bearer of a stolen card, reproducing such card for the use of a phony bearer will be ineffective since the verifier will unscramble and display the face of the original bearer rather than the face of the phony bearer.

Even though keying in a password only takes a couple of seconds, this step can be eliminated by recording the descramble control code directly on the card which is automatically read by a conventional card reader. Surprisingly, recording the descramble code upon the card, even without encrypting it, does not substantially compromize security, for reasons to be explained.

Optionally, the scrambled image could be a second non-head on or side view picture of the bearer which provides further information along with the conventional head-on picture. Also, the scrambled facial image need only be a very minor portion such as a stripe of the side view to save computer scrambling steps, and to also retain additional side view information for identification. The thus scrambled stripe would be like a cancellation line over a postage stamp and when unscrambled, would "disappear". Only one or two scrambled pixel columns would suffice for this purpose.

To further deter counterfeiting, the pixel scrambling and descrambling codes in the issue station printer and the verifiers in the field respectively, are changed and updated quarterly for processing newly issued cards, while the old codes for expired cards are disgarded. Since the codes of the scrambling algorithms or swap tables are unrelated to the scramble control codes themselves, security is further enhanced.

Other security enhancing features to be explained, involve automatically recording the issue clerk's initials on the card, and recording the remaining unscrambled portion of the side view facial image upon a video tape under suspicious circumstances during verification, to thus preserve evidence of unlawful use of a card for use in further investigation and possible criminal prosecution.

Still further objects, features and advantages of the present invention will become apparent upon study of the following description taken in conjunction with the drawings in which:

DESCRIPTION OF PREFERRED
EMBODIMENTS OF THE INVENTION

Figure 1:
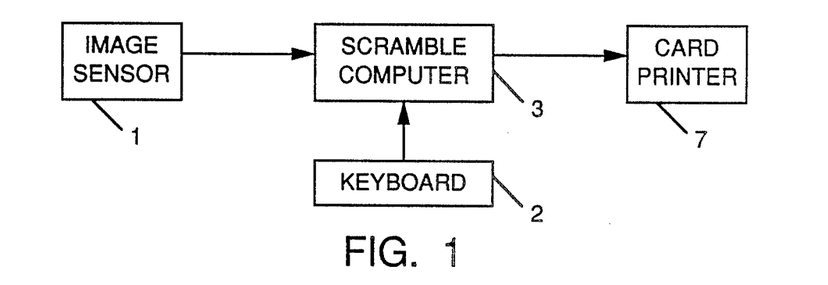
FIG. 1 discloses the aforesaid electronic ID card printing system.
Figure 2:
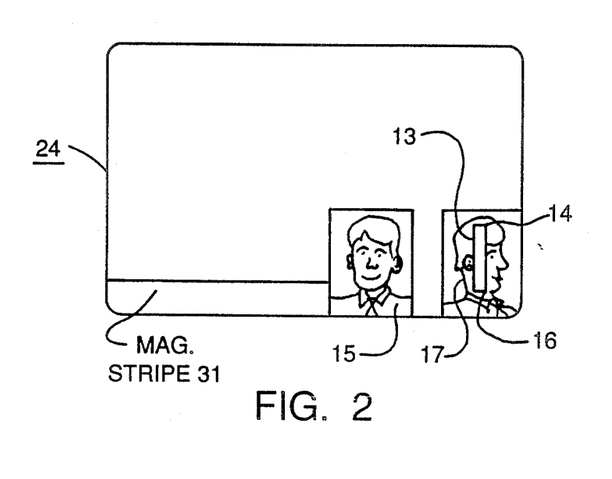
FIG. 2 illustrates one form of ID card processed in accordance with the invention.

As shown in FIG. 1, an electronic CCD camera or image sensor 1 is coupled to PC 3 which could employ "desk top publishing" software described above for recording printed indicia and a conventional facial image 15 on the card as shown in FIG. 2. A conventional electronic printer such as an ink jet printer 7 is utilized for this purpose. At the issue station, which could be a passport issuing office, immagration service or migrant worker control facility, welfare office, company or military base, and the like, the pixel scramble control code, which could be the last three digits of the bearer's social security number, is keyed into the PC by the issue clerk via keyboard 2.

The method of the invention was simulated by the program listed below and written in the basic computer language. The program simulated scrambling and descrambling of an eighty pixel stripe 13 of the non-head on facial image 17 of the bearer which stripe preferably extends between the forehead area 14 and the chin area 16 shown in FIG. 2. The first hundreds digit selects one of ten permutation or swap scrambling codes stored in tables recorded upon the software, which causes arbitrary swapping of numerous widely separated pixels of the facial image, twenty on average, between two forty cell pixel blocks aligned in an eighty pixel slice 13 through the facial image of the original pixel array inputted into the first data processor of the issue station computer. A standard basic computer language swap command was employed as indicated in the source code listed below. The second tens digit selects one of ten swap tables to cause a second set of swaps to occur and the third units digit causes a third set of swaps to occur in like manner.

Thus the three digit scramble control code selects three permutation tables out of the thirty tables available, which cause selected pixels to be sequentially swapped three times between widely separated portions of two aligned forty cell linear arrays making up the stripe. Thus chin and hair portions are swapped with central portions adjacent the nose for good scrambling.

Since there are 1000 three digit numbers, one thousand different scramble modes are available, one of which is selected by the particular scramble control code of a given bearer to enhance security. The particular three selected permutation or swap tables together with the scramble control code for selecting these three particular tables thus constitute one facial image scrambling algorithm out of a possible one thousand scrambling algorithms for this three digit example.

As a result, the original facial image stripe or slice 13 is scrambled three times in succession by the program in the first issue station data processor 3, and the thus scrambled stripe is recorded on the card by ink jet printer 7, along with the remaining unscrambled side view facial image. The entire side view facial image could, if desired, be scrambled in like manner. Upon verification, the bearer inputs his or her three digit number or descrambled control code into the verifier by a small keyboard 21. The program in the second data processor (preferably a microprocessor) 22 of FIG. 3, utilizes this descramble command code to sequentially select the same permutation or swap tables used in the issue station software.

Thus if the three digits inputted into the verifier by the bearer via keyboard 21 are the same digits used at the issue station to scramble the image, the image will be properly unscrambled. If only a single digit is different, the wrong permutation or swap table will be selected and the image will remain scrambled. This was clearly demonstrated by running the simulation program listed below. The scrambled image on card 24 is inputted into a digital pixel storage array of the second data processor 22 in the verifier by the use of a miniature, inexpensive electronic image sensor or CCD camera 26 of FIG. 3, positioned adjacent the card 24 after it is inserted within card reader 25. Upon full insertion of the card into the verifier reader, image sensor 26 is aligned with scrambled image 13. A tiny lamp 35 illuminates the scrambled image stripe 13. Image sensor 26 could be monochromatic as could CRT display 27 to save manufacturing costs.

Figure 3:
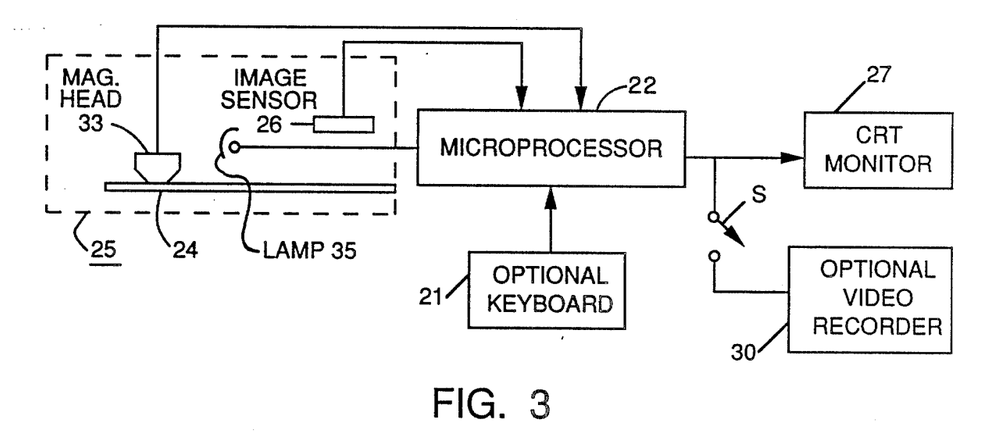
FIG. 3 illustrates one form of verifier utilized in accordance with the invention.

The resulting unscrambled image outputted from the verifier, is now displayed upon a small CRT monitor or liquid crystal display 27. If all or part of the image is still scrambled, the guard is alerted to further check the identity of the bearer. The first step would be to carefully view the conventional unscrambled head-on facial image 15 recorded upon the card. The use of the verifier of the invention thus advantageously conditions the guard to take a look at the bearer rather than not bothering at all, as is commonplace. This is because the bearer stops and inserts his card into the reader to produce an image on the CRT monitor 27 which prompts the guard. Thus security is enhanced by the method of the invention.

If the image on the monitor is not fully descrambled, the guard is alerted. Under these suspicious circumstances, the guard actuates via switch S, a conventional (optional) vidicon recorder or frame grabber 30 coupled to the verifier output, which records the non-head on image having the scrambled stripe therethrough. Thus a record is made of possible unauthorized bearers which could thus preserve evidence of an attempted unlawful entry or facility use (e.g. espionage, immigration, welfare fraud and the like). This is an advantage of the presently preferred scrambled stripe approach rather than scrambling the entire image 17, since much useful unscrambled facial image data remains. Another advantage of the scrambled stripe approach is that less computer steps are required, which could enable the use of a smaller micro-processor in the second data processor 22 of the verifier.

Why bother with the video tape recorder at all since the guard could merely confiscate the card with its unscrambled image 15 thereon? For law enforcement purposes, it is often desirable not to arouse suspicion to make further investigation easier. Also, it may be undesirable for certain unarmed security personnel (e.g. welfare office clerks) to get involved in a scene with an unauthorized bearer. The video recordation by video recorder 30, could be later used for further investigation of unlawful card use and as evidence for prosecution purposes. Also the recorder could automatically record the time, date and location of the incident for this purpose.

Figure 4:
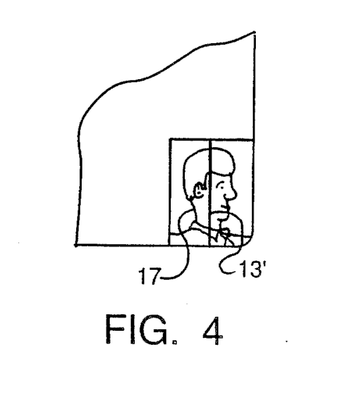
FIG. 4 illustrates the advantageous use of the aforesaid one or two pixel column thin scrambled stripe overlaying the unscrambled side view of the bearer.

For the aforesaid reasons the stripe approach is currently preferred rather than scrambling the entire side view image 17. As indicated in FIG. 4, one or two pixel columns only could be scrambled to produce a line 13' on the CRT monitor which overlays facial image 17. Should the pixel column(s) remain unscrambled, the line would look like a postage stamp cancellation line and would "disappear" if properly unscrambled.

It is an important feature of this invention that even though a counterfeiter is able to obtain the social security number or other "secret" password of the bearer used to descramble the facial image, he cannot duplicate a stolen genuine card for use by a phony bearer, since the correct social security number will cause the facial image of the original bearer to be displayed by CRT monitor 27. The thirty randomly generated permutation or swap tables, ten for each digit in the above example, cause arbitrary swapping of pixels between the two forty bit pixel storage arrays A and B in the source code listed below. Thus there are no logical swap algorithms to figure out. It is thus almost impossible for a counterfeiter to know how to create a scrambled image on a counterfeit card which could be unscrambled by a given social security number, whether phony or real.

Larger image portions or the entire image may be scrambled if desired to cause him to try to unscramble up to say 256*256 pixels. Even if only two forty byte pixel slices are scrambled, there are over one trillion (two to the fortieth power) swap modes, only one thousand of which are operative for any particular issue period such as a calendar quarter. Thus the scrambling swap algorithm comprises N sequentially applied forty bit permutation or swap tables for scrambling and descrambling the facial image, where N is the number of digits, which could be more than three digits of the bearer's social security number. If substantial portions of the image are to be scrambled, additional permutation tables may be employed, or the same three tables could be sequentially applied on a column by column basis.

Should a counterfeiter gain possession of a verifier, he could partially rebuild the machine by replacing the miniature image sensor 26 with a large field CCD camera and take a picture of a phony bearer and record this image on a card by designing an interface circuit for interfacing an ink jet printer with the output of the verifier. However, this will gain him nothing since the verifier will scramble the image. He would then try to figure out the scramble pattern on a genuine card and somehow try to scramble the image of the phony bearer in a way that a verifier would descramble it. All he sees on a genuine card is a jumbled mess, giving no clue as to how to scramble the phony bearer's image before recording it on a card. His problem is that there are over a trillion (two to the fortieth power) different permutations of pixel positions even for an eighty array cell stripe 13. If greater image portions are scrambled, the problem is greatly compounded. Even if he knows the password associated with a stolen card, he cannot access the swap or permutation tables in the verifier, since he cannot access them within the smart cards in the verifier, and thus he lacks knowledge of the particular scramble mode associated with a particular descramble control code. This fact, surprisingly, enables recording the descramble control code, even in uncrypted form, directly on the genuine card, as explained below, rather than using a password, if this is desired.

The method of the present invention differs substantially in purpose and in function compared to scrambling and unscrambling sensitive data transmitted over communication links. In that case, the data must remain secret. In the present invention the data (scrambled image) need not be secret since unscrambling the data merely results in a display of the facial image of the original authorized bearer and not a phony bearer. Also, even the unscrambled key need not be secret for the reasons described in the preceeding paragraph.

Be that as it may, in view of the importance of security, a new set of altered, updated permutation or swap tables are preferably utilized in the issue station printer and in the verifiers in the field from time to time to further deter counterfeiting. For example, for each new quarterly (three month) issue period, new chips or IC smart cards containing digital data storage therein, which data is impossible to read out, are inserted into a mother board in the printers and verifiers. As old cards expire, the oldest swap tables are disabled and are no longer used. In other words, the old smart cards having the old swap tables would be disgarded. Each new smart card would contain the new swap tables for cards issued during the current three month period. An appropriate steering code is recorded on magnetic stripe 31 by the first data processor 3 at the issue station, so that the proper set of swap tables associated with a particular three month issue period would be utilized by the verifier data processors.

As mentioned above, some users may prefer to eliminate the need for the bearer to key in the descramble control code comprising the bearer's social security number or a three digit portion thereof, which incidentially only takes a couple of seconds. Keying in a password could be confusing to certain classes of bearers such as elderly welfare recipients. In this case, the descramble command code could be recorded upon the magnetic stripe 31 shown in FIG. 2 during issuance of card 24. The keyboard 21 would be replaced or supplemented by a card reader 25 comprising a single magnetic stripe reading head 33 which reads the descramble command code off of the magnetic stripe on card 24 and inputs it into the verifier data processor 22. The reader is inexpensive and conventional. The bits of the code are sequentially read off of the card upon insertion of the card into the reader. Alternatively, the miniature image sensor 26 could input the code into the verifier if it was recorded on the card optically at the issue station, or a bar code reader could be used.

Another feature of the present invention is that the descramble control codes, whether they be valid passwords or social security numbers need not be stored in the verifier data processor (or in a central computer) for matching with inputted passwords, in contrast to numerous prior art password verification methods. This is because the scrambled image on the card inherently contains, in effect, the valid password since the image will not be unscrambled in response to a password not assigned to an authorized bearer. At the same time the scrambled image functions to verify only the identity of the authorized bearer upon being descrambled, besides being virtually counterfeit proof.

The simulation computer program written in basic and set forth below, simulated an eighty byte slice (pixel column or columns) of the image to be scrambled and unscrambled. Each pixel comprises one or more bytes of data to reproduce 64 plus of gray scale intensity levels and/or color rather than bits, which were used on the simulation output display to illustrate graphically the scrambling and descrambling of the image, represented by zeros and ones. In the interest of brevity and economy, only highlights of the program will be discussed, remaining portions of the program will be obvious to the skilled programmer.

In accordance with another feature of the invention, each issue clerk operating the card printer enters a password, at the beginning of a session, which is matched with his or her password stored in the first data processor. If there is a match, the clerk's initials or other identifying data is automatically recorded upon the magnetic stripe 31, or otherwise recorded upon the card. See program line (pl)40 and subroutine (sub) 6000. Although there will generally be far fewer printers than verifiers in operation, the printers are still subject to compromise if the counterfeiter is able to bribe or blackmail an issue clerk to issue phony cards to phony bearers. This feature will discourage this from occurring. If a phony bearer is caught at a later time, the presence of the issue clerk's initials on the card could help incriminate the clerk. Since the clerks would be informed of this procedure, it will have a deterrent effect. The clerk would not be able to change the initials automatically recorded on the card by the printer.

Ten, hundreds digit swap tables (pl-910-1000) are stored in ten arrays SH (pl-220-310); ten, tens digit swap tables (pl-1010-1100) are stored in ten arrays ST (pl-320-410), and ten, units digit swap tables (pl-1010-1100) are stored in ten arrays SU. The upper pixel slice (hair to nose) is stored in the A array and the lower pixel slice (nose to chin) is stored in the B array, each forty cell array containing forty gray scale values (10-89); see pl 870-900 and 200-210.

The program simulated the stripe by displaying a "1" if the pixel intensity value <50 and a "2" if the value was >49. See print control sub 1990. Widely separated cell values of all the cells in each array were swapped if the swap or permutation tables selected by the control codes contained a "1", otherwise they were left alone. pl 55-710 select the three swap tables in accordance with the scramble control code as previously explained. Selected swapping of intensity values between corresponding cells of the A and B arrays is performed sequentially by the three selected coding algorithms found in pl-1260-1980. These selections are made by pl-550-690 in the first data processor at the issue station, and are made in the verifiers by pl-740-850. Note that the program accesses the same swap algorithms for both the issue station data processor and the verifier data processor.

For each scramble step, the newly scrambled data was displayed on the PC screen due to repeated access to sub 1990. At the verifier the three digit descramble code is entered into the second data processor; see pl 740-760 and the same set of swap tables are again sequentially accessed bt the three digits to reverse scramble the facial image pixel data. See pl 766-860. If only one descramble code digit differed from a scramble code digit, good scrambling occurred and the original bands of long blocks of ones and twos simulating the input image (pl 610) were visually destroyed. Note that the program is not processing "1"s and "2"s. Rather, the gray scale intensity values in the A and B arrays are being processed. These intensity values were printed out on the Tandy 1000 computer screen just to clearly show the scrambling and unscrambling of the inputted test image (pl-610 inputs the test image from the initial contents of the A and B arrays). The test image had six interlaced bands of "1"s and "2"s stored in the arrays as intensity values of <50 and <49, respectively. Thus the program does not scramble binary values, e.g. blacks and whites.

As previously discussed, a counterfeiter could possess a verifier, partially rebuild it and attempt to enter the image of a confederate phony bearer to print out a scrambled code which could be printed on a phony card and later descrambled by a regular verifier. I discovered that if a simulated input test image of a phony bearer was run through the verifier processing section of my earlier program twice, that the image was reconstructed at the verifier output on the second pass through the verifier. Thus he could possibly use the scrambled output of the first pass to make a counterfeit card.

This potential security risk is thwarted by adding subs 3000 and 5000 to the program. Sub 3000 is a first auxilliary scrambling algorithm and sub 5000 is a second auxilliary algorithm which is complementary to sub 3000 in a manner to have no effect if the facial image data is processed through both algorithms in both the issue station printer software and the verifier in the normal manner. The first algorithm affects the data by reversing all pixel positions (pl-3110) just before recordation thereof upon the card and the second algorithm cancels this effect by re-reversing them (pl-5200) in the verifier. If the counterfeiter attempts the procedure described in the preceeding paragraph, the pixel positions will be scrambled on the first pass through the verifier and will remain scrambled to prevent reconstruction of the phony bearer facial test image on the second and subsequent pass through the verifier. This means that the scrambled image outputted by the verifier on the first pass cannot be printed on the card to be descrambled by another verifier, even if the descramble control code is unknown. More specifically, the first auxilliary scrambling algorithm never gets to operate on the data in a manner complementary to the second algorithm, to otherwise nullify the asymmetric effect of the second auxillary algorithm on the data.

Numerous variations may be made in the practise of the invention and thus the scope of the invention is to be defined by a fair reading of the terms of the claims and art recognized equivalents thereof. For example, other scrambling algorithms such as shifting algorithms may be employed which differ substantially from the swap algorithms used in the listed program. The swap algorithms were used for convenience in working in the basic computer language. Also, the intensity level bytes defining the intensity of each pixel, need not be actually scrambled three times in the above example. The A and B arrays making up the stripe could each initially have ascending cell identification numbers therein (e.g. one for the first cell two for the second and forty for the last cell). These cell numbers could be scrambled three times and the cell numbers in the fully scrambled arrays could then be used to call up the associated stored intensity level bytes in the original facial image pixel array in accordance with the scrambled cell numbers. The source code for the final simulation program is reproduced below.

APPENDIX

I claim:
1. Method of issuing and utilizing an ID card comprising the steps of:
   (a) producing facial image pixel data within a first data processor having sufficient information capable of reproducing at least a portion of the facial image of an ID card bearer;
   (b) employing said first data processor to scramble pieces of said facial image pixel data;
   (c) recording scrambled facial image data proportional to said pieces of said facial image pixel data scrambled in accordance with step (b) upon said ID card;
   (d) producing facial image pixel data within a second data processor proportional to said scrambled facial image data recorded upon said card in accordance with step (c);
   (e) utilizing said second data processor to descramble said pieces of facial image pixel data read off of said ID card to produce descrambled facial image pixel data within said second data processor;
   (f) employing the descrambled facial image pixel data to recreate the facial image of said ID card bearer to verify the authenticity of said ID card bearer; and
   (g) wherein step (b) includes inputting a pixel scramble control code assigned to an ID card bearer into said first data processor upon issuance of said ID card to a card bearer to select a given scramble code out of a plurality of scramble codes, and wherein step (e) includes inputting a pixel descramble control code, related to said scramble control code, into said second data processor to select a given descramble code capable of descrambling the facial image pixel data.

2. The method of claim 1 further including the step of causing said first data processor to automatically record personnel identification data upon each issued card indicating the identity of a particular clerk issuing said card to inhibit said particular clerk from issuing unauthorized cards to unautorized bearers.

3. The method of claim 2 including the steps of entering a password assigned to said clerk into said first data processor and generating particular personnel identification data associated with said password for recordation on said card.

4. The method of claim 1 wherein step (b) is performed by swapping relative positions of pieces of said facial image pixel data.

5. The method of claim 1 including the steps of recording said descramble control code related to said scramble control code upon said ID card upon issuance of said card, reading said descramble control code off of said card and inserting said descramble control code into said second data processor upon verification of the authenticity of the bearer of said card.

6. The method of claim 5 wherein said facial image is a non-head-on image of said bearer, and further including the step of additionally recording a head-on image of said bearer upon said card to enhance facial image information identifying said bearer and also to identify said bearer should said second data processor malfunction.

7. The method of claim 5 further including the step of utilizing altered updated scrambling and descrambling algorithms from time to time in said first and second data processors respectively, for newly issued cards, to further deter counterfeiting.

8. The method of claim 1 wherein said facial image is a non-head-on image of said bearer, and further including the step of additionally recording a head-on image of said bearer upon said card to enhance facial image information identifying said bearer and also identify said bearer should said second data processor malfunction.

9. The method of claim 8 further including the step of utilizing altered updated scrambling and descrambling algorithms from time to time in said first and second data processors respectively, for newly issued cards, to further deter counterfeiting.

10. The method of claim 1 further including the step of utilizing altered updated scrambling and descrambling algorithms from time to time in said first and second data processors respectively, for newly issued cards, to further deter counterfeiting.

11. The method of claim 1 wherein said pixel scramble and pixel descramble control codes are employed to select pixel position scrambling and descrambling codes for scrambling and descrambling said pieces of facial image pixel data respectively, and wherein said pixel position scrambling and descrambling codes per se bear no relationship to said scramble and descramble control codes to further protect the integrity of the method.

12. The method of claim 1 wherein each piece of facial image pixel data comprises bytes representitive of at least thirty two gray scale picutre intensity levels.

13. Method of issuing and utilizing an ID card comprising the steps of:
  (a) producing facial image pixel data within a first data processor having sufficient information capable of reproducing at least a portion of the facial image of an ID card bearer;
  (b) employing said first data processor to scramble pieces of said facial image pixel data;
  (c) recording scrambled facial image data proportional to said pieces of facial image pixel data scrambled in accordance with step (b) upon said ID card;
  (d) producing facial image pixel data within a second data processor proportional to said scrambled facial image data recorded on said card in accordance with step (c);
  (e) utilizing said second data processor to descramble said pieces of facial image pixel data read off of said ID card to produce descrambled facial image pixel data within said second data processor;
  (f) employing the descrambled facial image pixel data to recreate the facial image of said ID card bearer to verify the authenticity of said ID card bearer; and
  (g) wherein step (b) includes scrambling a minor portion of said facial image pixel data and further including the step of recording said descrambled facial image pixel data upon a recording medium for further reference, thereby to preserve unscrambled portions of the facial image of the bearer, particularly under suspicious circumstances.

14. The method of claim 13 further including the step of causing said first data processor to automatically record personnel identification data upon each issued card indicating the identity of a particular clerk issuing said card to inhibit said particular clerk from issuing unauthorized cards to unauthorized bearers.

15. The method of claim 14 including the steps of entering a password assigned to said clerk into said first data processor and generating particular personnel identification data associated with said password for recordation on said card.

16. The method of claim 13 wherein said facial image is a non-head-on image of said bearer, and further including the step of additionally recording a head-on image of said bearer upon said card to enhance facial image information identifying said bearer and also identify said bearer should said second data processor malfunction.

17. The method of claim 13 further including the step of utilizing altered updated scrambling and descrambling algorithms from time to time in said first and second data processors respectively, for newly issued cards, to further deter counterfeiting.

18. Method of issuing and utilizing an ID card comprising the steps of:
  (a) producing facial image pixel data within a first data processor having sufficient information capable of reproducing at least a portion of the facial image of an ID card bearer;
  (b) employing said first data processor to scramble pieces of said facial image pixel data;
  (c) recording scramble facial image data proportional to said pieces of facial image pixel data scrambled in accordance with step (b) upon said ID card;
  (d) producing facial image pixel data within a second data processor proportional to said scrambled facial image data recorded on said card in acordance with step (c);
  (e) utilizing said second data processor to descramble said pieces of facial image pixel data read off of said ID card to produce descrambled facial image pixel data within said second data processor;
  (f) employing the descrambled facial image pixel data to recreate the facial image of said ID card bearer to verify the authenticity of said ID card bearer; and
  (g) wherein said pieces of facial image pixel data scrambled in accordance with step (b) includes at least upper and lower portions of said facial image but wherein said pieces of facial image pixel data constitute only a minor portion of said facial image.

19. The method of claim 18 further including the step of causing said first data processor to automatically record personnel identification data upon each issued card indicating the identity of a particular clerk issuing said card to inhibit said particular clerk issuing unauthorized cards to unauthorized bearers.

20. The method of claim 19 including the steps of entering a password assigned to said clerk into said first data processor and generating particular personnel identification data associated with said password for recordation on said card.

21. The method of claim 18 wherein step (b) is performed by swapping relative positions of pieces of said facial image pixel data.

22. The method of claim 18 wherein each piece of facial image pixel data comprises bytes representitive of at least thirty-two gray scale picture intensity levels.

23. The method of claim 18 wherein said facial image is a non-head-on image of said bearer, and further including the step of additionally recording a head-on image of said bearer upon said card to enhance facial image information identifying said bearer and also to identify said bearer should said second data processor malfunction.

24. The method of claim 18 further including the step of utilizing altered updated scrambling and descrambling algorithms from time to time in said first and second data processors respectively, for newly issued cards, to further deter counterfeiting.

25. Method of issuing and utilizing an ID card comprising the steps of:
  (a) producing facial image pixel data within a first data processor having sufficient information capable of reproducing at least a portion of the facial image of an ID card bearer;
  (b) employing said first data processor to scramble pieces of said facial image pixel data;
  (c) recording scrambled facial image data proportional to said pieces of facial image pixel data scrambled in accordance with step (b) upon said ID card;
  (d) producing facial image pixel data within a second data processor proportional to said scrambled facial image data recorded upon said card in accordance with step (c);
  (e) utilizing said second data processor to descramble said pieces of facial image pixel data read off of said ID card to produce descrambled facial image pixel data within said second data processor;
  (f) employing the descrambled facial image pixel data to recreate the facial image of said ID card bearer to verify the authenticity of said ID card bearer; and (g) further including the steps of providing auxialliary scrambling of said facial image pixel data processed within said first data processor in accordance with a first scrambling algorithm and providing auxilliary descrambling of facial image pixel data processed in said second data processor in accordance with a second descrambling algorithm complementary with respect to said first scrambling algorithm in a manner to nullify the effect of said first and second algorithms on pixel data processed in accordance with said method, only if both said first and second algorithms operate on the facial image pixel data processed by said second data processor.

26. The method of claim 25 wherein step (b) is performed by swapping relative positions of pieces of said facial image pixel data.

27. Method of issuing and utilizing an ID card comprizing the steps of:

(a) producing facial image pixel data within a first data processor having sufficient information capable of reproducing at least a portion of the facial image of an ID card bearer;

(b) employing said first data processor to scramble pieces of said facial image pixel data;

(c) recording scrambled facial image data proportional to said pieces of facial image pixel data scrambled in accordance with step (b) upon said ID card;

(d) producing facial image pixel data within a second data processor proportional to said scrambled facial image data recorded on said card in accordance with step (c);

(e) utilizing said second data processor to descramble said pieces of facial image pixel data read off of said ID card to produce descrambled facial image pixel data within said second data processor;

(f) employing the descrambled facial image pixel data to recreate the facial image of said ID card bearer to verify the authenticity of said ID card bearer; and (g) further including the step of causing said first data processor to automatically record personnel identification data upon issued cards indicating the identity of a particular clerk issuing said card to inhibit said particular clerk from issuing unauthorized cards to unauthorized card bearers.

28. The method of claim 27 including the step of causing said first data processor to generate said personnel identification data associated with a password assigned to said clerk, said password enabling said clerk to access said first data processor.

* * * * *

UNITED STATES PATENT AND TRADEMARK OFFICE
CERTIFICATE OF CORRECTION

PATENT NO. : 4,972,476

DATED : November 20, 1990

INVENTOR(S) : Nathans

Page 1 of 7

It is certified that error appears in the above-identified patent and that said Letters Patent is hereby corrected as shown below:

Column 9, line 43, the following computer program should be inserted.

Signed and Sealed this

Third Day of September, 1991

*Attest:*

*Attesting Officer*

HARRY F. MANBECK, JR.

*Commissioner of Patents and Trademarks*

```
10 REM Source code for simulating scrambled facial image ID card method
20 CLS
30 INPUT"Do you wish to operate the recordation of issue clerk's initials on card sub     (enter y or n)";IN$
40 IF IN$="y" OR IN$="Y" THEN GOSUB 6000
90 PRINT:PRINT"The inputted pixel rows shown horizontally for convenience, would actually     be vertical pixel slices through the central facial image of the bearer.
100 PRINT:PRINT"Thus we scramble upper face (forehead) pixels with lower face pixels.
110 N=40
120 DIM A(N):DIM B(N):DIM SA(N)
130 DIM SH0(N):DIM SH1(N):DIM SH2(N):DIM SH3(N):DIM SH4(N)
140 DIM SH5(N):DIM SH6(N):DIM SH7(N): DIM SH8(N):DIM SH9(N)
150 DIM ST0(N): DIM ST1(N):DIM ST2(N):DIM ST3(N):DIM ST4(N)
160 DIM ST5(N): DIM ST6(N):DIM ST7(N):DIM ST8(N):DIM ST9(N)
170 DIM SU0(N): DIM SU1(N):DIM SU2(N):DIM SU3(N):DIM SU4(N)
180 DIM SU5(N): DIM SU6(N):DIM SU7(N):DIM SU8(N):DIM SU9(N)
190 FOR C=1 TO N
200 READ A(C):NEXT
210 FOR C=1 TO N:READ B(C):NEXT
220 FOR C=1 TO N:READ SH0(C):NEXT
230 FOR C=1 TO N:READ SH1(C):NEXT
240 FOR C=1 TO N:READ SH2(C):NEXT
250 FOR C=1 TO N:READ SH3(C):NEXT
260 FOR C=1 TO N:READ SH4(C):NEXT
270 FOR C=1 TO N:READ SH5(C):NEXT
280 FOR C=1 TO N:READ SH6(C):NEXT
290 FOR C=1 TO N:READ SH7(C):NEXT
300 FOR C=1 TO N:READ SH8(C):NEXT
310 FOR C=1 TO N:READ SH9(C):NEXT
320 FOR C=1 TO N:READ ST0(C):NEXT
330 FOR C=1 TO N:READ ST1(C):NEXT
340 FOR C=1 TO N:READ ST2(C):NEXT
350 FOR C=1 TO N:READ ST3(C):NEXT
360 FOR C=1 TO N:READ ST4(C):NEXT
370 FOR C=1 TO N:READ ST5(C):NEXT
380 FOR C=1 TO N:READ ST6(C):NEXT
390 FOR C=1 TO N:READ ST7(C):NEXT
400 FOR C=1 TO N:READ ST8(C):NEXT
410 FOR C=1 TO N:READ ST9(C):NEXT
420 FOR C=1 TO N:READ SU0(C):NEXT
430 FOR C=1 TO N:READ SU1(C):NEXT
440 FOR C=1 TO N:READ SU2(C):NEXT
450 FOR C=1 TO N:READ SU3(C):NEXT
460 FOR C=1 TO N:READ SU4(C):NEXT
470 FOR C=1 TO N:READ SU5(C):NEXT
480 FOR C=1 TO N:READ SU6(C):NEXT
490 FOR C=1 TO N:READ SU7(C):NEXT
500 FOR C=1 TO N:READ SU8(C):NEXT
510 FOR C=1 TO N:READ SU9(C):NEXT
```

```
530 PRINT:INPUT"Enter number of image pixel slices you wish to simulate=";L1
540 L=L1-1
550 PRINT:INPUT"Issue clerk types hundreds digit from bearer's SS#number=";K:K=K+1
560 PRINT:INPUT"Issue clerk types tens digit from SS#=";K2:K2=K2+1
570 PRINT:INPUT"Issue clerk types units digit from SS#=";K3:K3=K3+1
600 CLS
610 GOSUB 1990
620 RC=RC+1:IF RC>L THEN 630 ELSE 610
630 RC=0:ON K GOSUB 1260,1290,1320,1350,1380,1410,1440,1470,1500,1530
640 GOSUB 1990
650 RC=RC+1:IF RC>L  THEN GOTO 660 ELSE 640
660 RC=0:ON K2 GOSUB 1580,1610,1630,1650,1670,1690,1710,1730,1750,1770
670 GOSUB 1990
680 RC=RC+1:IF RC>L THEN 690 ELSE 670
690 RC=0:ON K3 GOSUB 1790,1810,1830,1850,1870,1890,1910,1930,1950,1970
692 GOSUB 1990
710 RC=RC+1:IF RC>L THEN 720 ELSE 692
720 GOSUB 3000
722 PRINT"last pixel slice line printed on card":PRINT
740 INPUT"Verifier reads hundreds digit off card=";K:K=K+1
750 INPUT"Verifier reads tens digit off of card=";K2:K2=K2+1
760 INPUT"Verifier reads units digit off of card=";K3:K3=K3+1
762 GOSUB 5000
766 RC=RC+1:IF RC>L THEN 770 ELSE 762
770 RC=0:ON K3 GOSUB 1790,1810,1830,1850,1870,1890,1910,1930,1950,1970
780 GOSUB 1990
790 RC=RC+1:IF RC>L THEN 800 ELSE 780
800 RC=0:ON K2 GOSUB 1580,1610,1630,1650,1670,1690,1710,1730,1750,1770
810 GOSUB 1990
820 RC=RC+1:IF RC>L THEN 830 ELSE 810
830 RC=0:ON K  GOSUB 1260,1290,1320,1350,1380,1410,1440,1470,1500,1530
840 GOSUB 1990
850 RC=RC+1:IF RC>L THEN 860 ELSE 840
860 PRINT"The image immediately above is printed or CRT displayed by the verifie.
862 INPUT"Do you wish to put phony bearer image back into the verifier (y or n)";OI$
864 IF OI$="y" THEN 762
866 END
870 DATA 10,11,12,13,14,15,16,17,18,19,50,51,52,53,54,55,56,57,58,59
880 DATA 60,61,62,63,64,65,66,67,68,69,20,21,22,23,24,25,26,27,28,29
890 DATA 70,71,72,73,74,75,76,77,78,79,30,31,32,33,34,35,36,37,38,39
900 DATA 40,41,42,43,44,45,46,47,48,49,80,81,82,83,84,85,86,87,88,89
910 DATA 2,1,1,1,2,2,1,2,1,2,2,2,1,2,1,2,1,2,1,2,2,2,2,2,2,1,2,1,2,1,2,1,2,2,2,2,2,1,1,2
920 DATA 1,1,1,2,2,2,1,1,2,1,2,2,1,2,1,2,2,1,1,2,1,1,1,2,2,1,2,2,2,2,2,1,1,1,2,1,2,1,2,1
930 DATA 1,1,1,1,2,1,1,2,1,1,1,2,2,1,2,1,2,1,2,2,2,2,2,2,1,1,2,1,2,1,2,1,2,1,2,1,2,1,2,2
```

```
940 DATA 1,1,1,1,1,2,2,2,1,2,1,2,1,2,1,2,2,2,2,2,1,2,1,2,1,1,1,1,1,2,2,1,2,1,2,1
,2,1,2,1
950 DATA 1,1,1,2,2,2,1,2,1,1,1,2,2,1,2,1,2,2,2,1,1,1,2,1,2,1,2,1,2,2,2,2,1,1,1,2
,1,2,2,2
960 DATA 1,1,2,2,2,2,2,1,1,2,2,1,1,2,2,2,2,1,2,1,1,1,2,1,2,1,2,1,2,1,2,1,2,1,2,2
,2,2,2,2
970 DATA 1,1,1,2,2,1,2,1,2,1,2,1,2,1,2,2,2,1,1,1,2,2,2,1,1,1,2,1,2,1,2,2,2,1,2,1
,2,1,2,2
980 DATA 1,2,2,1,2,1,2,1,2,2,1,1,1,1,1,1,1,2,2,1,2,2,2,2,1,2,1,2,2,2,1,1,1,2,2
,2,2,2,2
990 DATA 1,1,1,2,2,1,1,2,2,1,1,2,2,1,1,2,2,1,1,2,1,2,1,1,1,1,2,2,1,2,1,2,1,2,1,1
,1,1,1,1
1000 DATA 1,1,1,1,2,2,2,2,1,1,2,1,2,2,2,1,1,2,1,1,2,1,2,1,2,1,2,2,2,2,1,1,1,1,
2,1,2,1,1
1010 DATA 1,1,1,1,2,2,2,1,2,1,2,1,1,1,2,1,2,1,1,1,1,2,1,2,2,2,2,2,2,1,2,1,2,
2,1,1,1,2
1020 DATA 2,2,2,1,2,1,2,1,1,1,2,1,2,2,1,2,1,2,2,2,2,1,1,2,1,2,1,2,1,1,2,2,1,1,1,
2,1,2,1,2
1030 DATA 2,2,2,1,2,2,2,1,1,1,1,2,1,2,1,2,1,2,1,2,2,2,1,2,1,2,1,1,2,1,1,2,1,2,
2,2,1,2,1
1040 DATA 1,1,1,1,2,2,2,1,2,1,1,1,2,1,2,2,1,1,1,2,1,2,1,2,1,2,1,2,2,2,2,2,2,
2,2,2,2,1
1050 DATA 1,1,1,1,2,2,1,2,1,2,1,2,1,2,1,2,1,2,1,1,1,2,2,2,1,1,1,1,2,1,1,1,2,2,
1,2,1,2,1
1060 DATA 1,1,1,1,2,2,2,1,2,1,1,2,1,2,1,2,1,2,1,2,1,2,1,2,2,2,1,1,1,1,2,1,2,
2,1,2,1,2
1070 DATA 2,2,2,2,1,2,2,1,2,1,2,1,2,2,2,1,2,1,2,1,2,1,2,1,2,1,2,2,2,2,1,1,1,
2,1,2,1,2
1080 DATA 1,1,1,2,2,1,2,1,2,1,2,2,2,1,1,1,2,1,2,1,2,1,2,1,2,2,2,1,2,1,1,1,2,1,2,
1,2,1,2,1
1090 DATA 2,2,2,2,1,1,2,1,2,1,2,2,1,1,1,2,1,2,1,2,2,1,2,1,2,1,2,1,2,1,2,2,2,
2,1,2,1,2
1100 DATA 1,1,2,1,2,2,2,1,2,1,2,2,1,1,2,2,1,1,2,2,1,2,1,2,1,2,1,2,1,2,2,2,1,1,
1,2,2,2,1
1110 DATA 2,2,2,1,1,1,2,1,2,1,1,2,2,1,2,1,2,2,2,1,1,1,2,1,2,2,1,2,1,2,2,2,1,2,
1,2,1,2,1
1120 DATA 1,2,1,2,1,2,1,2,1,2,1,2,2,2,1,1,2,1,2,1,2,1,2,1,2,1,1,1,1,1,1,2,1,
2,2,2,2,1
1130 DATA 2,2,2,1,1,1,1,1,1,2,1,2,1,2,2,2,1,1,1,2,1,1,2,2,1,1,2,2,1,1,1,2,1,2,
1,2,1,2,1
1140 DATA 1,1,1,1,1,2,2,2,2,1,2,2,2,1,2,2,2,1,1,1,1,2,1,2,1,2,2,2,1,1,1,2,2,1,2,
1,1,2,1,2
1150 DATA 2,2,1,2,1,2,2,1,1,2,1,2,2,2,1,2,1,2,2,2,1,1,1,2,1,2,1,2,2,2,1,2,1,2,
2,2,2,2,2
1160 DATA 1,1,1,1,1,1,1,1,2,2,1,2,1,2,1,2,2,2,2,2,1,2,1,2,1,2,1,1,1,2,2,1,2,1,
2,1,2,1,2
1170 DATA 2,2,2,1,2,1,2,1,2,2,2,2,1,2,2,2,1,1,1,2,1,2,1,2,2,1,1,2,2,1,1,1,1,1,2,
1,1,1,1,2
1180 DATA 1,1,1,2,1,2,2,2,2,2,1,1,2,2,2,2,1,1,1,1,2,1,2,1,2,1,2,1,2,2,1,1,1,2,2,1,
2,1,2,2,1
1190 DATA 1,1,1,2,2,2,1,1,1,2,2,2,2,1,1,1,2,1,2,1,2,1,2,1,2,1,2,1,2,1,2,1,2,2,2,
1,1,2,1,1
```

```
1200 DATA 1,1,1,2,1,2,1,2,2,2,1,1,1,2,2,2,1,1,1,2,1,2,2,1,1,1,2,1,2,1,2,1,2,1,2,
1,2,1,1,1
1240 END
1250 REM subroutine to scramble 2 40 byte pixel arrays A(c);B(c) of facial image
1252 REM hundreds digit of control code selects one of 10 forty bit swap tables.
1254 REM These swap subroutines are used in both card printer and verifier.
1260 FOR C=1 TO N
1270 IF SH0(C)=1 THEN SWAP A(C), B(C)
1280 NEXT:RETURN
1290 FOR C=1 TO N
1300 IF SH1(C)=1 THEN SWAP A(C), B(C)
1310 NEXT:RETURN
1320 FOR C=1 TO N
1330 IF SH2(C)=1 THEN SWAP A(C), B(C)
1340 NEXT:RETURN
1350 FOR C=1 TO N
1360 IF SH3(C)=1 THEN SWAP A(C), B(C)
1370 NEXT:RETURN
1380 FOR C=1 TO N
1390 IF SH4(C)=1 THEN SWAP A(C), B(C)
1400 NEXT:RETURN
1410 FOR C=1 TO N
1420 IF SH5(C)=1 THEN SWAP A(C), B(C)
1430 NEXT:RETURN
1440 FOR C=1 TO N
1450 IF SH6(C)=1 THEN SWAP A(C), B(C)
1460 NEXT:RETURN
1470 FOR C=1 TO N
1480 IF SH7(C)=1 THEN SWAP A(C),B(C)
1490 NEXT:RETURN
1500 FOR C=1 TO N
1510 IF SH8(C)=1 THEN SWAP A(C),B(C)
1520 NEXT:RETURN
1530 FOR C=1 TO N
1540 IF SH9(C)=1 THEN SWAP A(C),B(C)
550 NEXT:RETURN
580 REM Tens digit of control code selects 1 of 10 swap tables
590 FOR C=1 TO N:IF ST0(C)=1 THEN SWAP A(C),B(C)
600 NEXT:RETURN
610 FOR C=1 TO N:IF ST1(C)=1 THEN SWAP A(C),B(C)
620 NEXT:RETURN
1630 FOR C=1 TO N:IF ST2(C)=1 THEN SWAP A(C),B(C):RETURN
1640 NEXT:RETURN
1650 FOR C=1 TO N:IF ST3(C)=1 THEN SWAP A(C),B(C):RETURN
1660 NEXT:RETURN
1670 FOR C=1 TO N:IF ST4(C)=1 THEN SWAP A(C),B(C)
1680 NEXT:RETURN
1690 FOR C=1 TO N:IF ST5(C)=1 THEN SWAP A(C),B(C)
1700 NEXT:RETURN
1710 FOR C=1 TO N:IF ST6(C)=1 THEN SWAP A(C),B(C)
1720 NEXT:RETURN
```

```
1730 FOR C=1 TO N:IF ST7(C)=1 THEN SWAP A(C),B(C)
1740 NEXT:RETURN
1750 FOR C=1 TO N:IF ST8(C)=1 THEN SWAP A(C),B(C)
1760 NEXT:RETURN
1770 FOR C=1 TO N:IF ST9(C)=1 THEN SWAP A(C),B(C)
1780 NEXT:RETURN
1782 REM Units digit of control code selects 1 of 10 swap tables.
1790 FOR C=1 TO N:IF SU0(C)=1 THEN SWAP A(C),B(C)
1800 NEXT:RETURN
1810 FOR C=1 TO N:IF SU1(C)=1 THEN SWAP A(C),B(C)
1820 NEXT:RETURN
1830 FOR C=1 TO N:IF SU2(C)=1 THEN SWAP A(C),B(C)
1840 NEXT:RETURN
1850 FOR C=1 TO N:IF SU3(C)=1 THEN SWAP A(C),B(C)
1860 NEXT:RETURN
1870 FOR C=1 TO N:IF SU4(C)=1 THEN SWAP A(C),B(C)
1880 NEXT:RETURN
1890 FOR C=1 TO N:IF SU5(C)=1 THEN SWAP A(C),B(C)
1900 NEXT:RETURN
1910 FOR C=1 TO N:IF SU6(C)=1 THEN SWAP A(C),B(C)
1920 NEXT:RETURN
1930 FOR C=1 TO N:IF SU7(C)=1 THEN SWAP A(C),B(C)
1940 NEXT:RETURN
1950 FOR C=1 TO N:IF SU8(C)=1 THEN SWAP A(C),B(C)
1960 NEXT:RETURN
1970 FOR C=1 TO N:IF SU9(C)=1 THEN SWAP A(C),B(C)
1980 NEXT:RETURN
1990 REM subroutine to display scrambled pixel slices as they are scrambled/unsc
rambled. Original image simulated by bands of first line printed;last line match
es first line for same control codes.
2000 FOR C=1 TO N:IF A(C)<50 AND A(C)>0 THEN PRINT "1";
2002 IF A(C)>49 THEN PRINT"2";
2004 IF A(C)=0 THEN PRINT"8";
2010 NEXT
2020 FOR C=1 TO N:IF B(C)<50 THEN PRINT"1" ;ELSE PRINT"2" ;
2030 NEXT
2040 RETURN
3000 REM auxilliary scramble sub to reverse pixel order in a(c) to record sa(c)
n card
3100 BEEP:FOR C=1 TO 40
3110 SA(C)=A(41-C)
3200 IF SA(C)<50 AND SA(C)>0 THEN PRINT"1";
3300 IF SA(C)>49 THEN PRINT"2";
3400 IF SA(C)=0 THEN PRINT"8";
3500 NEXT
3510 FOR C=1 TO 40
3512 IF B(C)<50 THEN PRINT"1";
3514 IF B(C)>49 THEN PRINT"2";
3516 NEXT:RETURN
```

```
5000 REM Auxilliary rescramble sub complementary to 3000
5100 FOR C=1 TO 40:A(C)=0:NEXT:FOR C=1 TO 40
5200 A(C)=SA(41-C)
5210 IF A(C)<50 THEN PRINT"1";
5220 IF A(C)>49 THEN PRINT"2";
5230 NEXT
5240 FOR C=1 TO 40
5250 IF B(C)<50 THEN PRINT"1";
5260 IF B(C)>49 THEN PRINT"2";
5280 NEXT:PRINT:RETURN
6000 REM print clerk's initials on card or shut down program if wrong password
6100 PRINT"The cards are issued by 3 clerks with initials RLN, RJK and ABC, having the     passwords 'dog' 'cat' and 'bird' respectively.
6200 INPUT"What is your password (type y or n and press enter)";P$
6400 IF P$="dog" THEN PRINT"RLN printed on card":RETURN
6500 IF P$="cat" THEN PRINT"RJK printed on card":RETURN
6600 IF P$="bird" THEN PRINT"ABC printed on card":RETURN
6700 PRINT"Improper password entered. Access unauthorized...program operation halted
6710 BEEP:BEEP:BEEP:BEEP
6800 INPUT"Do you wish to try again";R$
6900 IF R$="y" OR R$="Y" THEN RUN
6910 PRINT"To rerun program type run and press enter"
```